US005661285A

United States Patent [19]

Elrick et al.

[11] Patent Number: 5,661,285

[45] Date of Patent: Aug. 26, 1997

[54] SELF-SERVICE, BANKING SYSTEM

[75] Inventors: Alexander D. Elrick; Brian G. Hutchison, both of Dundee; Alexander W. Logie, West Lothian, all of Scotland

[73] Assignee: NCR Corporation, Dayton, Ohio

[21] Appl. No.: 662,733

[22] Filed: Jun. 10, 1996

[30] Foreign Application Priority Data

Jan. 30, 1996 [GB] United Kingdom .................... 9601839

[51] Int. Cl.[6] ........................................ G06K 5/00

[52] U.S. Cl. ........................................ 235/380; 235/379

[58] Field of Search ................................ 235/379, 380

[56] References Cited

U.S. PATENT DOCUMENTS 5,180,902 1/1993 Shick et al. .

5,591,949 1/1997 Bernstein ................................ 235/380

*Primary Examiner*—Harold Pitts

*Attorney, Agent, or Firm*—Michael Chan

[57] ABSTRACT

An automated teller machine (ATM) receives a user's identifying card from a card user and deactivates the card in accordance with at least one user selectable condition. The ATM comprises an input device for entering data to the ATM and a card reading mechanism for receiving the card from the user. The input device is a keyboard associated with the ATM. Control means deactivate the card in accordance with the at least one user selectable condition when the card is received by the card reading mechanism and the user enters certain data on the input device. The control means include a local processor which is located at the ATM and which can communicate with a remote processor located at a bank site. The certain data may include information corresponding to at least one time period during which the card is to be deactivated. Alternatively, the certain data may include information corresponding to at least one ATM at which the card is to remain activated, with the card being deactivated for all other ATMs.

12 Claims, 2 Drawing Sheets

SELF-SERVICE, BANKING SYSTEM

BACKGROUND OF THE INVENTION

The present invention relates to a self-service, banking system comprising a user's identifying card and an automated teller machine (ATM) which is capable of receiving the card, and is particularly directed to a method of deactivating a user's identifying card at an ATM.

The operation of ATMs is well known. Typically, a bank customer inserts a user's identifying card into the ATM and enters certain data (such as codes, quantity of currency required or to be paid in, type of transaction, etc.) upon a keyboard associated with the ATM. The ATM then processes the transaction, updates the customer's account to reflect the current transaction, dispenses cash, when requested, and returns the card to the customer as part of a routine operation.

It should be apparent that the user's identifying card is a key element in this self-service, banking system. Since the ATM is able to dispense cash, it is important that security measures be taken to prevent unauthorized use of the user's identifying card. For example, a known security measure taken to prevent unauthorized use of the card is to provide the customer with a personal identification number (PIN) which must be entered upon the keyboard of the ATM before the ATM can process any transaction. Mother known security measure taken to prevent unauthorized use of the card is to provide the customer with a phone number of a bank security organization to call to report a lost or stolen card. When a lost or stolen card is reported, the bank security organization takes the necessary steps to deactivate the card to prevent further use of the card.

SUMMARY OF THE INVENTION

In accordance with one aspect of the present invention, a method of deactivating an ATM user's identifying card to inhibit unauthorized use of the card comprises the steps of receiving the card from the user at an ATM, and deactivating the received card in accordance with at least one user selectable condition in response to a request entered by the user in the ATM.

Preferably, the user selectable condition is at least one time period during which the card is to be maintained deactivated. Alternatively, the user selectable condition may be that the card is only able to be used at one or more selected ATMs. After deactivation, the card is returned to the user at the ATM. The returned card is maintained deactivated in accordance with the at least one user selected condition to inhibit unauthorized use of the card until the deactivation of the card ceases to be effective.

In accordance with another aspect of the present invention, an automated teller machine (ATM) receives a user's identifying card from a card user and deactivates the card in accordance with at least one user selectable condition. The ATM comprises an input device for entering data to the ATM and a card reading mechanism for receiving the active card from the user. Control means are provided for bringing about deactivation of the card in accordance with the at least one user selectable condition when the card is received by the card reading mechanism and the user enters certain data on the input device.

Preferably, the input device is a keyboard associated with the ATM. The control means includes a local processor which is located at the ATM and which is arranged to communicate with a remote processor located at a bank site.

The certain data may include information corresponding to at least one time period during which the card is to be deactivated. Alternatively, the certain data may include information corresponding to at least one ATM at which the card is able to be used, with the card being deactivated for all other ATMs.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

The present invention is directed to a method of deactivating a user's identifying card at an automated teller machine (ATM) in accordance with user selected conditions selectable by an authorized card user at the ATM. The user selectable conditions may include time periods during which the card may be deactivated and/or one or more specified ATMs at which the card may be used with the card being deactivated for use with all other ATMs. A self-service, banking system 10 embodying the present invention is illustrated in FIG. 1.

Figure 1:
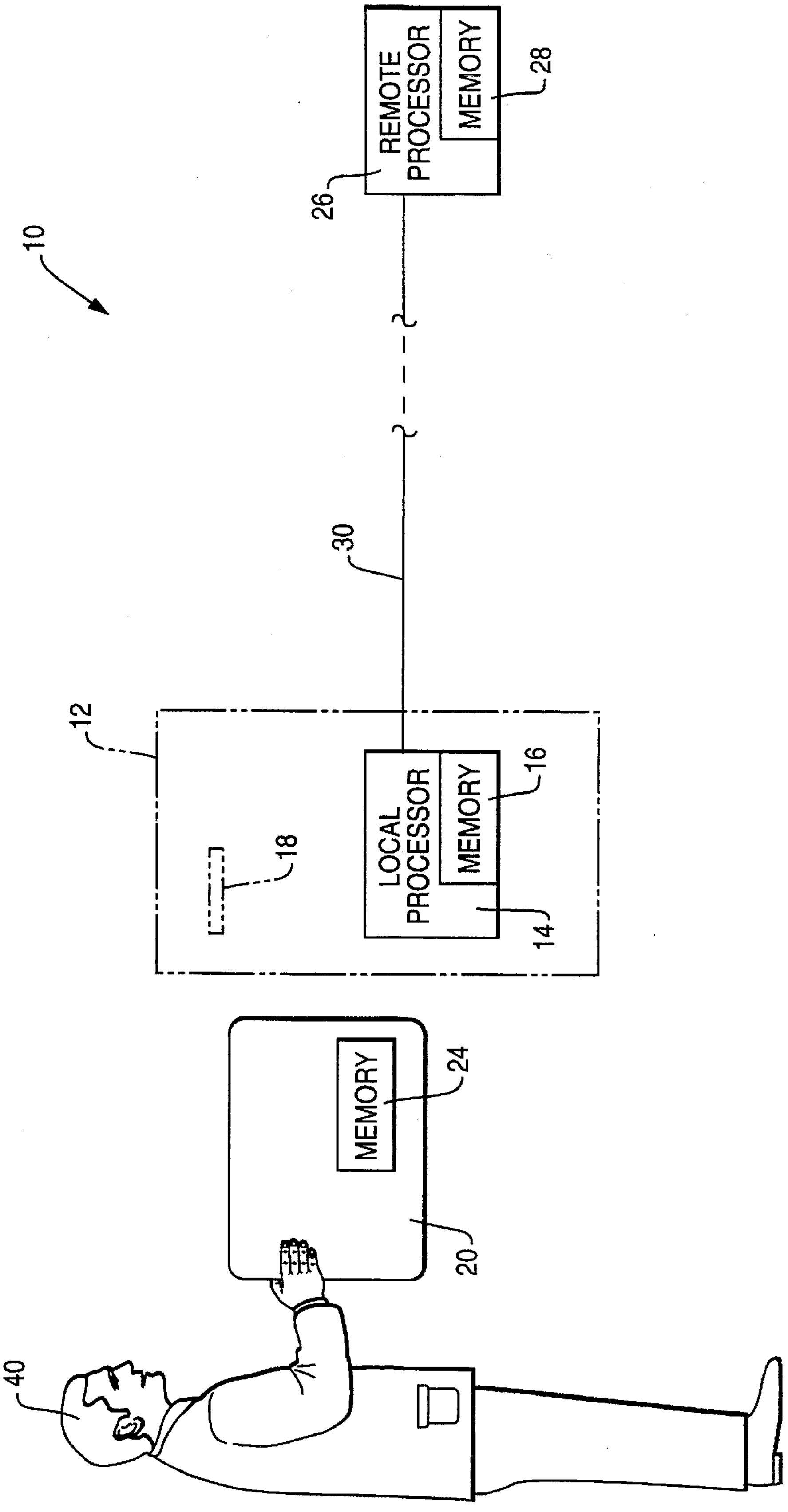
FIG. 1 is a schematic block diagram illustrating a self-service, banking system embodying the present invention.

Referring to FIG. 1, the self-service, banking system 10 comprises an automated teller machine (ATM) 12 which includes a local processor 14 and a local memory 16 associated with the local processor 14. The ATM 12 further includes a card reading mechanism 18 which can receive a user's identifying card 20. As is well known, the card 20 includes a memory 24 in which is stored identifying information including an encrypted version of the user's PIN and account information relating to the user. The card 20 is carried by a bank customer 40 and is insertable into the card reading mechanism 18 by the customer when the customer desires to execute a financial transaction at the ATM 12.

The banking system 10 further comprises a remote processor 26 and a remote memory 28 associated with the remote processor 26. The remote processor 26 and the remote memory 28 may be located at a bank branch or a central bank location. The remote processor 26 communicates with the local processor 14 via a communication link 30.

Figure 2:
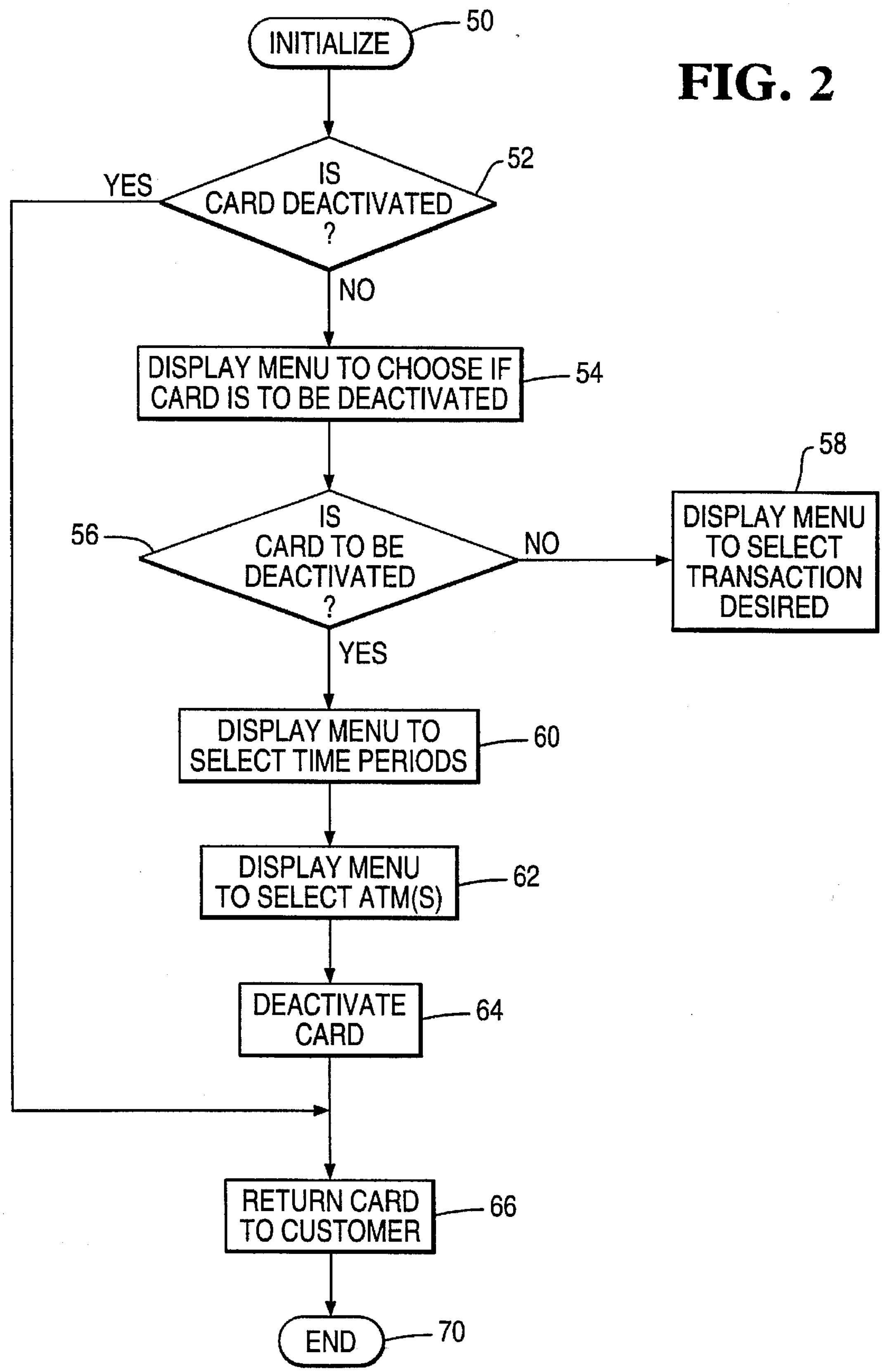
FIG. 2 is a flowchart depicting operation of the self-service, banking terminal of FIG. 1 in accordance with the present invention.

In accordance with the present invention, the customer 40 is able to insert the card 20 into the card reading mechanism 18 of the ATM 12 and deactivate the card 20 in accordance with user selectable conditions. FIG. 2 is a flowchart which depicts operation of the ATM 12 to selectively deactivate the card 20 after the card has been inserted into the card reading mechanism 18 by the customer 40. The ATM 12 operates in accordance with programming steps of a program stored in the local memory 16.

After the ATM 12 is initialized in step 50 of FIG. 2, the program proceeds to step 52 in which a determination is made as to whether the inserted card 20 is already deactivated for the current time and/or for the ATM being used. If the determination in step 52 is affirmative, the program proceeds to step 66 to actuate the card reading mechanism 18 to return the card 20 to the customer 40. When this occurs, the customer 40 cannot carry out any financial transaction at the ATM 12. The program then terminates as shown in step 70.

If the determination in step 52 is negative, the program proceeds to step 54 in which a menu is displayed to allow the customer 40 to choose if the card 20 should be deactivated. A determination is then made in step 56 as to whether the customer 40 has chosen to deactivate the card 20. If the determination in step 56 is negative, the program proceeds to step 58 in which a menu is displayed to allow the customer 40 to select the financial transaction desired to be carried out at the ATM 12. If the determination in step 56 is affirmative, the program proceeds to step 60.

In step 60, a menu is displayed to the customer 40 to allow the customer to choose the time period(s) during which the card 20 is to be deactivated. For example, the customer 40 may choose to deactivate the card 20 at all ATMs for the period between tomorrow and the end of the current month. The specific time periods available to be selected will depend upon the particular application program the local processor 14 is executing. By customizing the application program, the specific time periods available to be selected can be tailored to the particular financial institution which owns the ATM 12. It is conceivable that the customer 40 may not wish to deactivate the card 20 during specific time periods. Accordingly, a selection is available on the menu of step 60 which allows the customer 40 to skip the selection of any specific time period(s).

After the customer 40 has either skipped the selection of specific time period(s) of step 60 or selected certain time period(s) during which the card 20 is to be deactivated, the program proceeds to step 62. In step 62, a menu is displayed to the customer 40 to allow the customer to select at least one specific ATM at which the card is to remain activated, with the card 20 to be inactivated at all other ATMs. For example, the customer 40 may choose that the card 20 should only, remain active for those ATMs in a particular geographic location where the customer will be on vacation. The capability of selecting a specific group of ATMs or groups of ATMs at which the card 20 will remain activated will depend upon the particular application program the local processor 14 is executing. Accordingly, the selection of a specific group or groups of ATMs can also be customized by the financial institution which owns the ATM 12. It should be understood that the selection of specific ATM(s) and the deactivation of other ATMs in step 62 can be made effective for selected time period(s) only as selected in step 60. It is conceivable that the customer 40 may not desire to activate the card 20 for selected ATM(s) only. Accordingly, a selection is available on the menu of step 62 which allows the customer 40 to skip the selection of specific ATM(s).

After the customer 40 has either skipped the selection procedure of step 62 or has selected certain ATM(s) at which the card 20 is to remain activated, the program proceeds to step 64. In step 64, the card 20 is deactivated in accordance with the user selected condition(s) of step 60 and/or step 62. When this occurs, data stored in the memory 28 of the remote processor 26 is altered in a manner to indicate that the card 20 is to be deactivated in accordance with the user selected condition(s). The program then proceeds to step 66 in which the card reading mechanism 18 is actuated to return the card 20 which has been deactivated in accordance with the user selected condition(s) to the customer 40. When the card 20 has been returned to the customer 40, the program ends as shown in step 70.

It is contemplated that when the card 20 is deactivated in accordance with the user selected condition(s) as described hereinabove, any duplicate cards will not be able to be used in accordance with the same user selected condition(s). This is possible because of the data which was transmitted from the local memory 16 to the remote memory 28. The data stored in the remote memory 28 prevents the card 20 as well as any duplicate cards from accessing the ATM 12 in accordance with the user selected condition(s).

To cancel selective deactivation of a card, it is contemplated that the customer 40 will need to go in person to a branch of the financial institution which owns the ATM 12. However, it is also possible that the customer 40 may have other options to activate the deactivated card, such as by contacting the financial institution by telephone.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of deactivating an ATM user's identifying card to inhibit unauthorized use of the card, the method comprising the steps of:

(a) receiving the card from the user at an ATM; and (b) deactivating the received card of step (a) in accordance with at least one user selectable condition in response to a request entered by the user in the ATM.

2. A method according to claim 1, further comprising the step of:

(c) after step (b), returning the card to the user.

3. A method according to claim 2, further comprising the step of:

(d) maintaining the returned card of step (c) deactivated in accordance with the at least one user selected condition to inhibit unauthorized use of the card until the deactivation of step (b) ceases to be effective.

4. A method of deactivating an ATM user's identifying card to inhibit unauthorized use of the card, the method comprising the steps of:

(a) receiving the card from the user at an ATM; and (b) deactivating the received card of step (a) for at least one time period in response to the user selecting the at least one time period via an input device of the ATM.

5. A method according to claim 4, further comprising the step of:

(c) after step (b), returning the card to the user at the ATM.

6. A method of deactivating an ATM user's identifying card to inhibit unauthorized use of the card, the method comprising the steps of:

(a) receiving the card from the user at a first ATM; and (b) deactivating the received card of step (a) for use at any ATM other than at least one selected ATM in response to the user selecting said at least one selected ATM via an input device of said first ATM.

7. A method according to claim 6, further comprising the step of:

(c) after step (b), returning the card to the user at said first ATM.

8. An automated teller machine (ATM) for receiving a user's identifying card from a card user and for deactivating the card in accordance with at least one user selectable condition, the ATM comprising:

an input device for entering data in the ATM;

a card reading mechanism for receiving the card from the user; and control means for bringing about deactivation of the card in accordance with the at least one user selectable condition when the card is received by the card reading mechanism and the user enters certain data on the input device.

9. An ATM according to claim 8, wherein the input device is a keyboard associated with the ATM.

10. An ATM according to claim 8, wherein said control means includes a local processor which is located at the ATM and which is arranged to communicate with a remote processor located at a bank site.

11. An ATM according to claim 8, wherein the certain data includes information corresponding to at least one time period during which the card is to be deactivated.

12. An ATM according to claim 8, wherein the certain data includes information corresponding to at least one selected ATM at which the card is able to be used, with the card being deactivated for use with all other ATMs.

* * * * *